(12) United States Patent
Xu et al.

(10) Patent No.: US 10,344,151 B2
(45) Date of Patent: Jul. 9, 2019

(54) PROPYLENE-BASED POLYMER COMPOSITIONS FOR GRIP APPLICATIONS

(71) Applicant: ExxonMobil Chemical Patents Inc., Baytown, TX (US)

(72) Inventors: Jie Hui Xu, Shanghai (CN); Xin Chen, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 22 days.

(21) Appl. No.: 15/551,819

(22) PCT Filed: Mar. 27, 2015

(86) PCT No.: PCT/CN2015/000210
§ 371 (c)(1),
(2) Date: Aug. 17, 2017

(87) PCT Pub. No.: WO2011/154770
PCT Pub. Date: Oct. 6, 2016

(65) Prior Publication Data
US 2018/0030257 A1 Feb. 1, 2018

(51) Int. Cl.
*C08L 23/14* (2006.01)
*B29C 45/00* (2006.01)

(52) U.S. Cl.
CPC .......... *C08L 23/14* (2013.01); *B29C 45/0001* (2013.01); *C08L 2205/02* (2013.01); *C08L 2205/035* (2013.01)

(58) Field of Classification Search
CPC .............. C08L 2205/02; C08L 2205/03; C08L 2205/035; C08L 23/14; C08L 23/16
See application file for complete search history.

(56) References Cited

U.S. PATENT DOCUMENTS

| | | | |
|---|---|---|---|
| 7,294,681 B2 | 11/2007 | Jiang et al. | |
| 7,524,910 B2 | 4/2009 | Jiang et al. | |
| 7,989,542 B2 | 8/2011 | Natsuyama et al. | |
| 2008/0287597 A1* | 11/2008 | Pham | C08L 23/10 524/525 |
| 2010/0152382 A1* | 6/2010 | Jiang | C08F 10/06 525/53 |
| 2011/0198311 A1* | 8/2011 | Bernreitner | B29C 49/0005 215/373 |

FOREIGN PATENT DOCUMENTS

| | | | |
|---|---|---|---|
| EP | 2 818 512 A | 12/2014 | |
| GB | 2432161 | 5/2007 | |
| WO | 2007/142742 A | 12/2007 | |
| WO | WO-2012016965 A1 * | 2/2012 | .......... C08F 297/086 |
| WO | 2012/016965 A | 6/2012 | |
| WO | 2013/113814 A | 8/2013 | |
| WO | 2013/134038 | 9/2013 | |
| WO | 2013/134041 | 9/2013 | |
| WO | 2014/056175 A | 4/2014 | |

* cited by examiner

Primary Examiner — Christopher M Rodd (57) ABSTRACT

The present invention is related to a grip composition comprising 5 to 10 wt % of a polymer blend modifier, having a weight average molecular weight of 10,000 to 100,000 g/mole, 65 to 75 wt % of a propylene-based elastomer, having a weight average molecular weight of 100,000 to 300,000 g/mole, and a mineral powder. The polymer blend modifier comprises a first propylene-based polymer and a second propylene-based polymer, where the first and second propylene-based polymers are different and are individually selected from a homopolymer of propylene or a copolymer of propylene and ethylene or a $C_4$ to $C_{10}$ alpha-olefin. The composition further comprises 5 to 10 wt % of a propylene polymer, which is a homopolymer of propylene or a copolymer of propylene units with from 0.5 to 4 wt % ethylene or $C_4$ to $C_{10}$ alpha-olefin comonomer derived units.

20 Claims, 2 Drawing Sheets

PROPYLENE-BASED POLYMER COMPOSITIONS FOR GRIP APPLICATIONS

PRIORITY CLAIM

This application is a 371 National Phase Application of PCT Application Serial No. PCT/CN2015/000210, filed Mar. 27, 2015, which is incorporated herein by reference in its entirety.

FIELD OF INVENTION

The invention relates to a propylene-based composition for use in grip applications.

BACKGROUND

Polyolefin-based polymers, such as propylene-based polymers, are customarily provided in a molten form into an injection molding apparatus to construct a grip. The process generally includes the steps of adjusting a mold having multiple cavities, filling a mold with a molten polyolefin-based polymer or other injection material, and cooling the grip article constructed therefrom. Grips sought are those that have a uniform design (impacted by the polyolefin-based feed material's flow properties/ability to fill the injection mold) without requiring a lengthy manufacturing time (as measured by a parameter generally known in the art as Cycle Time).

Many different types of polymers are known and have been used in injection molding formulations. Exemplary polyolefin-based polymers and methods of making polymer compositions are disclosed in U.S. Pat. Nos. 7,294,681 and 7,524,910. WO Publication No. 2013/134038 discloses a method for producing a composition having at least two different propylene-based polymers produced in parallel reactors. The multi-modal composition has a Mw of about 10,000 g/mol to about 150,000 g/mol.

However, there remains a need for a propylene-based formulation for use in a grip application that can provide suitable flow properties, without compromising the manufacturing time of the resultant article, as compared to molding formulations that are currently available. The foregoing and/or other challenges are addressed by the methods and products disclosed herein.

SUMMARY

In one aspect, a composition is provided for use in a grip application. The grip composition comprises from 5 to 10 wt % of a polymer blend modifier based on the weight of the composition, from 65 to 75 wt % of a propylene-based elastomer based on the weight of the composition, and a mineral powder. The polymer blend modifier comprises a first propylene-based polymer and a second propylene-based polymer. The polymer blend modifier has a weight average molecular weight of 10,000 to 100,000 g/mole and the propylene-based elastomer has a weight average molecular weight of 100,000 to 300,000 g/mole. The composition further comprises 5 to 10 wt % of a propylene polymer based on the weight of the composition. The propylene polymer is a homopolymer of propylene or a copolymer of propylene units with from 0.5 to 4 wt % ethylene or $C_4$ to $C_{10}$ alpha-olefin comonomer derived units.

DETAILED DESCRIPTION

Various specific embodiments of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

The inventors have discovered that blending propylene-based polymers that have a low molecular weight, such as the polymer blend modifiers described herein, with higher molecular weight propylene-based polymers can be advantageously used in grips with good flow properties. It is believed that these benefits are obtained without compromising manufacturing time that is often seen in grips made with formulations containing only higher-molecular weight polyolefin polymers.

As used herein, the term "copolymer" is meant to include polymers having two or more monomers, optionally, with other monomers, and may refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic and random symmetries. The term "blend" as used herein refers to a mixture of two or more polymers. The term "elastomer" shall mean any polymer exhibiting some degree of elasticity, where elasticity is the ability of a material that has been deformed by a force (such as by stretching) to return at least partially to its original dimensions once the force has been removed.

"Propylene-based" as used herein, is meant to include any polymer comprising propylene, either alone or in combination with one or more comonomers, in which propylene is the major component (i.e., greater than 50 mol % propylene).

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

"Reactor blend," as used herein, means a highly dispersed and mechanically inseparable blend of two or more polymers produced in situ as the result of sequential or parallel polymerization of one or more monomers with the formation of one polymer in the presence of another, or by solution blending polymers made separately in parallel reactors. Reactor blends may be produced in a single reactor, a series of reactors, or parallel reactors and are reactor grade blends. Reactor blends may be produced by any polymerization method, including batch, semi-continuous, or continuous systems. Particularly excluded from "reactor blend" polymers are blends of two or more polymers in which the polymers are blended ex situ, such as by physically or mechanically blending in a mixer, extruder, or other similar device.

The polymers described herein, including the polymer blend modifier and the propylene-based elastomer, may be prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the process described above yields the catalytically active component (catalyst) of the catalyst system. Any given transition metal compound or catalyst precursor can yield a catalytically active component (catalyst) with various activators, affording a wide array of catalysts deployable in the processes described herein. Catalyst systems useful in the processes described herein comprise at least one transition metal compound and at least one activator. However, catalyst systems of the current disclosure may also comprise more than one transition metal compound in combination with one or more activators. Such catalyst systems may optionally include impurity scavengers. The triad tacticity and tacticity index of the polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

Polymer Blend Modifiers

The Polymer Blend Modifiers ("PBMs") useful for making the composition used to prepare grip applications of the invention comprise a first propylene-based polymer, wherein the first propylene-based polymer is a homopolymer of propylene or a copolymer of propylene and ethylene or a $C_4$ to $C_{10}$ alpha-olefin; and a second propylene-based polymer, wherein the second propylene-based polymer is a homopolymer of propylene or comprises a comonomer of ethylene or a $C_4$ to $C_{10}$ alpha-olefin; wherein the second propylene-based polymer is compositionally different than the first propylene-based polymer.

In an embodiment, the PBM has a melt viscosity, measured at 190° C. within the range of from about 800 or 1,000 or 5,000 cP to about 10,000 or 15,000 cP. In an embodiment, the PBM has a Melt Flow Rate ("MFR", 230° C./2.16 kg) within the range of from about 1,000 or 2,000 g/10 min to about 5,000 or 10,000 g/10 min. The polymer blend modifier has a weight average molecular weight of 10,000 or 25,000 or 50,000 to 75,000 or 100,000 g/mole.

Methods of Preparing PBMs

A solution polymerization process for preparing a PBM is generally performed by a system that includes a first reactor, a second reactor in parallel with the first reactor, a liquid-phase separator, a devolatilizing vessel, and a pelletizer. The first reactor and second reactor may be, for example, continuously stirred-tank reactors.

The first reactor may receive a first monomer feed, a second monomer feed, and a catalyst feed. The first reactor may also receive feeds of a solvent and an activator. The solvent and/or the activator feed may be combined with any of the first monomer feed, the second monomer feed, or catalyst feed or the solvent and activator may be supplied to the reactor in separate feed streams. A first polymer is produced in the first reactor and is evacuated from the first reactor via a first product stream. The first product stream comprises the first propylene-based polymer, solvent, and any unreacted monomer. A similar process may be used to produce a second product stream comprising the second propylene-based polymer, solvent, and any unreacted monomer.

In any embodiment, the first monomer in the first monomer feed may be propylene and the second monomer in the second monomer feed may be ethylene or a $C_4$ to $C_{10}$ olefin. In any embodiment, the second monomer may be ethylene, butene, hexene, and octene. Generally, the choice of monomers and relative amounts of chosen monomers employed in the process depends on the desired properties of the first polymer and final PBM. In any embodiment, the relative amounts of propylene and comonomer supplied to the first reactor may be designed to produce a polymer that is predominantly propylene, i.e., a polymer that is more than 50 mol % propylene. In another embodiment, the first reactor may produce a homopolymer of propylene.

The second propylene-based polymer is different than the first propylene-based polymer. The difference may be measured, for example, by the comonomer content, heat of fusion, crystallinity, branching index, weight average molecular weight, and/or polydispersity of the two polymers. In any embodiment, the second propylene-based polymer may comprise a different comonomer than the first propylene-based polymer or one polymer may be a homopolymer of propylene and the other polymer may comprise a copolymer of propylene and ethylene or a $C_4$ to $C_{10}$ olefin. For example, the first propylene-based polymer may comprise a propylene-ethylene copolymer and the second propylene-based polymer may comprise a propylene-hexene copolymer. In any embodiment, the second propylene-based polymer may have a different weight average molecular weight (Mw) than the first propylene-based polymer and/or a different melt viscosity than the first propylene-based polymer. Furthermore, in any embodiment, the second propylene-based polymer may have a different crystallinity and/or heat of fusion than the first polymer.

It should be appreciated that any number of additional reactors may be employed to produce other polymers that may be integrated with (e.g., grafted) or blended with the first and second polymers. Further description of exemplary methods for polymerizing the polymers described herein may be found in U.S. Pat. No. 6,881,800, which is incorporated by reference herein.

The first product stream and second product stream may be combined to produce a blend stream. For example, the first product stream and second product stream may supply the first and second polymer to a mixing vessel, such as a mixing tank with an agitator.

The blend stream may be fed to a liquid-phase separation vessel to produce a polymer rich phase and a polymer lean phase. The polymer lean phase may comprise the solvent and be substantially free of polymer. At least a portion of the polymer lean phase may be evacuated from the liquid-phase separation vessel via a solvent recirculation stream. The solvent recirculation stream may further include unreacted monomer. At least a portion of the polymer rich phase may be evacuated from the liquid-phase separation vessel via a polymer rich stream.

In any embodiment, the liquid-phase separation vessel may operate on the principle of Lower Critical Solution Temperature (LCST) phase separation. This technique uses the thermodynamic principle of spinodal decomposition to generate two liquid phases; one substantially free of polymer and the other containing the dissolved polymer at a higher concentration than the single liquid feed to the liquid-phase separation vessel.

Employing a liquid-phase separation vessel that utilizes spinodal decomposition to achieve the formation of two liquid phases may be an effective method for separating solvent from multi-modal polymer PBMs, particularly in cases in which one of the polymers of the PBM has a weight average molecular weight less than 100,000 g/mol, and even more particularly between 10,000 g/mol and 60,000 g/mol. The concentration of polymer in the polymer lean phase may be further reduced by catalyst selection.

Upon exiting the liquid-phase separation vessel, the polymer rich stream may then be fed to a devolatilizing vessel for further polymer recovery. In any embodiment, the polymer rich stream may also be fed to a low pressure separator before being fed to the inlet of the devolatilizing vessel. While in the vessel, the polymer composition may be subjected to a vacuum in the vessel such that at least a portion of the solvent is removed from the polymer composition and the temperature of the polymer composition is reduced, thereby forming a second polymer composition comprising the PBM and having a lower solvent content and a lower temperature than the polymer composition as the polymer composition is introduced into the vessel. The polymer composition may then be discharged from the outlet of the vessel via a discharge stream.

The cooled discharge stream may then be fed to a pelletizer where the PBM is then discharged through a pelletization die as formed pellets. Pelletization of the polymer may be by an underwater, hot face, strand, water ring, or other similar pelletizer. Preferably an underwater pelletizer is used, but other equivalent pelletizing units known to those skilled in the art may also be used. General techniques for underwater pelletizing are known to those of ordinary skill in the art.

Exemplary methods for producing useful PBMs are further described in International Publication No. 2013/134038, which is incorporated herein in its entirety. In particular, the catalyst systems used for producing semi-crystalline polymers of the PBM may comprise a metallocene compound and activator such as those described in International Publication No. 2013/134038. Exemplary catalysts may include dimethylsilyl bis(2-methyl-4-phenylindenyl) zirconium dichloride, dimethylsilyl bis(2-methyl-5-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl.

Polymers of the PBMs

As described herein, the PBM comprises a first propylene-based polymer and a second propylene-based polymer. Preferred first and/or second propylene-based polymers of the PBM are semi-crystalline propylene-based polymers. In any embodiment, the polymers may have a relatively low molecular weight, preferably about 100,000 g/mol or less. In any embodiment, the polymer may comprise a comonomer selected from the group consisting of ethylene and linear or branched $C_4$ to $C_{20}$ olefins and diolefins. In any embodiment, the comonomer may be ethylene or a $C_4$ to $C_{10}$ olefin.

In any embodiment, one or more polymers of the PBM may comprise one or more propylene-based polymers, which comprise propylene and from about 5 mol % to about 30 mol % of one or more comonomers selected from $C_2$ and $C_4$-$C_{10}$ α-olefins. In any embodiment, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers.

In any embodiment, the one or more polymers of the PBM may include at least about 5 mol %, at least about 6 mol %, at least about 7 mol %, or at least about 8 mol %, or at least about 10 mol %, or at least about 12 mol % ethylene-derived or hexene-derived units. In those or other embodiments, the copolymers may include up to about 30 mol %, or up to about 25 mol %, or up to about 22 mol %, or up to about 20 mol %, or up to about 19 mol %, or up to about 18 mol %, or up to about 17 mol % ethylene-derived or hexene-derived units, where the percentage by mole is based upon the total moles of the propylene-derived and α-olefin derived units. Stated another way, the propylene-based polymer may include at least about 70 mol %, or at least about 75 mol %, or at least about 80 mol %, or at least about 81 mol % propylene-derived units, or at least about 82 mol % propylene-derived units, or at least about 83 mol % propylene-derived units; and in these or other embodiments, the copolymers may include up to about 95 mol %, or up to about 94 mol %, or up to about 93 mol %, or up to about 92 mol %, or up to about 90 mol %, or up to about 88 mol % propylene-derived units, where the percentage by mole is based upon the total moles of the propylene-derived and alpha-olefin derived units. In any embodiment, the propylene-based polymer may comprise from about 5 mol % to about 25 mol % ethylene-derived or hexene-derived units, or from about 8 mol % to about 20 mol % ethylene-derived or hexene-derived units, or from about 12 mol % to about 18 mol % ethylene-derived or hexene-derived units.

The one or more polymers of the PBM of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In any embodiment, the Tm of the one or more polymers of the PBM (as determined by DSC) may be less than about 130° C., or less than about 120° C., or less than about 115° C., or less than about 110° C., or less than about 100° C., or less than about 90° C. In any embodiment, the Tm of the one or more polymers of the PBM may be greater than about 25° C., or greater than about 30° C., or greater than about 35° C., or greater than about 40° C. Tm of the one or more polymers of the PBM can be determined by taking 5 to 10 mg of a sample of the one or more polymers, equilibrating a DSC Standard Cell FC at −90° C., ramping the temperature at a rate of 10° C. per minute up to 200° C., maintaining the temperature for 5 minutes, lowering the temperature at a rate of 10° C. per minute to −90° C., ramping the temperature at a rate of 10° C. per minute up to 200° C., maintaining the temperature for 5 minutes, and recording the temperature as Tm.

In one or more embodiments, the crystallization temperature (Tc) of the one or more polymers of the PBM (as determined by DSC) is less than about 100° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc of the polymer is greater than about 0° C., or greater than about 5° C., or greater than about 10° C., or greater than about 15° C., or greater than about 20° C. In any embodiment, the Tc lower limit of the polymer may be 0° C., 5° C., 10° C., 20° C., 30° C., 40° C., 50° C., 60° C., and 70° C.; and the Tc upper limit temperature may be 120° C., 110° C., 100° C., 90° C., 80° C., 70° C., 60° C., 50° C., 40° C., 30° C., 25° C., and 20° C. with ranges from any lower limit to any upper limit being contemplated. Tc of the PBM can be determined by taking 5 to 10 mg of a sample of the composition, equilibrating a DSC Standard Cell FC at −90° C., ramping the temperature at a rate of 10° C. per minute up to 200° C., maintaining the temperature for 5 minutes, lowering the temperature at a rate of 10° C. per minute to −90° C., and recording the temperature as Tc.

The polymers suitable for in the PBM are said to be "semi-crystalline," meaning that in general they have a relatively low crystallinity. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semi-crystalline propylene copolymer having a heat of fusion of 95 J/g will have a crystallinity of 50%. The term "crystallizable" as used herein refers to those polymers which can crystallize upon stretching or annealing. Thus, in certain specific embodiments, the semi-crystalline polymer may be crystallizable. The semi-crystalline polymers used in specific embodiments preferably have a crystallinity of from 2% to 65% of the crystallinity of isotatic polypropylene. In further embodiments, the semi-crystalline polymers may have a crystallinity of from about 3% to about 40%, or from about 4% to about 30%, or from about 5% to about 25% of the crystallinity of isotactic polypropylene.

The semi-crystalline polymer of the PBM can have a level of isotacticity expressed as percentage of isotactic triads (three consecutive propylene units), as measured by $^{13}C$ NMR, of 75 mol % or greater, 80 mol % or greater, 85 mol % or greater, 90 mol % or greater, 92 mol % or greater, 95 mol % or greater, or 97 mol % or greater. In one or more embodiments, the triad tacticity may range from about 75 mol % to about 99 mol %, or from about 80 mol % to about 99 mol %, or from about 85 mol % to about 99 mol %, or from about 90 mol % to about 99 mol %, or from about 90 mol % to about 97 mol %, or from about 80 mol % to about 97 mol %. Triad tacticity is determined by the methods described in U.S. Patent Application Publication No. 2004/0236042.

The semi-crystalline polymer of the PBM may have a tacticity index m/r ranging from a lower limit of 4, or 6 to an upper limit of 10, or 20, or 25. The tacticity index, expressed herein as "m/r", is determined by $^{13}C$ nuclear magnetic resonance ("NMR"). The tacticity index m/r is calculated as defined by H. N. Cheng in *Macromolecules*, 17, 1950 (1984), incorporated herein by reference. The designation "m" or "r" describes the stereochemistry of pairs of contiguous propylene groups, "m" referring to meso and "r" to racemic. An m/r ratio of 1.0 generally describes an atactic polymer, and as the m/r ratio approaches zero, the polymer is increasingly more syndiotactic. The polymer is increasingly isotactic as the m/r ratio increases above 1.0 and approaches infinity.

In one or more embodiments, the semi-crystalline polymer of the PBM may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature and determined according to ASTM D-792.

In one or more embodiments, the semi-crystalline polymer of the PBM can have a weight average molecular weight (Mw) of from about 5,000 to about 500,000 g/mol, or from about 7,500 to about 300,000 g/mol, or from about 10,000 to about 200,000 g/mol, or from about 25,000 to about 175,000 g/mol.

Weight-average molecular weight, $M_w$, molecular weight distribution (MWD) or $M_w/M_n$ (also referred to as polydispersity index) where $M_n$ is the number-average molecular weight, and the branching index, g'(vis), are characterized using a High Temperature Size Exclusion Chromatograph (SEC), equipped with a differential refractive index detector (DRI), an online light scattering detector (LS), and a viscometer. Experimental details not shown below, including how the detectors are calibrated, are described in: T. Sun, P. Brant, R. R. Chance, and W. W. Graessley, Macromolecules, Volume 34, Number 19, pp. 6812-6820, 2001. In one or more embodiments, the PBM can have a polydispersity index of from about 1.5 to about 6.

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranges from 1.0 to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm$^3$, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, Light Scattering from Polymer Solutions, Academic Press, 1971):

$$[K_o c/\Delta R(\theta,c)] = [1/MP(\theta)] + 2A_2 c$$

where $\Delta R(\theta)$ is the measured excess Rayleigh scattering intensity at scattering angle $\theta$, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 (dn/dc)^2}{\lambda^4 N_A}$$

in which $N_A$ is the Avogadro's number, and dn/dc is the refractive index increment for the system. The refractive index, n=1.500 for TCB at 135° C. and $\lambda$=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_w$, is defined as the sum of the products of the molecular weight $M_i$ of each fraction multiplied by its weight fraction $w_i$:

$$M_w \equiv \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i$$

The number-average molecular weight, $M_n$, is defined as the sum of the products of the molecular weight $M_i$ of each fraction multiplied by its mole fraction $x_i$:

$$M_n \equiv \Sigma x_i M_i = \Sigma N_i M_i / \Sigma N_i$$

since the mole fraction $x_i$ is defined as $N_i$ divided by the total number of molecules $$x_i = N_i / \Sigma N_i$$

In the SEC, a high temperature Viscotek Corporation viscometer is used, which has four capillaries arranged in a Wheatstone Bridge configuration with two pressure transducers. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, $[\eta]$, at each point in the chromatogram is calculated from the following equation:

$$\eta_S = c[\eta] + 0.3(c[\eta])^2$$

where c was determined from the DRI output.

The branching index (g', also referred to as g'(vis)) is calculated using the output of the SEC-DRI-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i}$$

where the summations are over the chromatographic slices, i, between the integration limits.

The branching index g' is defined as:

$$g' = \frac{[\eta]_{avg}}{k M_v^\alpha}$$

where k=0.000579 and $\alpha$=0.695 for ethylene polymers; k=0.0002288 and $\alpha$=0.705 for propylene polymers; and k=0.00018 and $\alpha$=0.7 for butene polymers.

$M_v$ is the viscosity-average molecular weight based on molecular weights determined by the LS analysis:

$$M_v \equiv (\Sigma c_i M_i^\alpha / \Sigma c_i)^{1/\alpha}$$

In one or more embodiments, the semi-crystalline polymer of the PBM may have a viscosity (also referred to a Brookfield viscosity or melt viscosity), measured at 190° C. and determined according to ASTM D-3236 from about 100 cP to about 500,000 cP, or from about 100 to about 100,000 cP, or from about 100 to about 50,000 cP, or from about 100 to about 25,000 cP, or from about 100 to about 15,000 cP, or from about 100 to about 10,000 cP, or from about 100 to about 5,000 cP, or from about 500 to about 15,000 cP, or from about 500 to about 10,000 cP, or from about 500 to about 5,000 cP, or from about 1,000 to about 10,000 cP, wherein 1 cP=1 mPa·sec.

The polymers that may be used in the grip compositions disclosed herein generally include any of the polymers formed as disclosed in International Publication No. 2013/134038. The triad tacticity and tacticity index of a polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

Propylene-Based Elastomers

The compositions used to prepare grip applications described herein comprise one or more propylene-based elastomers ("PBEs"). The PBE comprises propylene and from about 5 to about 25 wt % of one or more comonomers selected from ethylene and/or $C_4$-$C_{12}$ $\alpha$-olefins. The $\alpha$-olefin comonomer units may be derived from ethylene, butene, pentene, hexene, 4-methyl-1-pentene, octene, or decene. In preferred embodiments the $\alpha$-olefin is ethylene. In some embodiments, the propylene-based polymer composition consists essentially of propylene and ethylene, or consists only of propylene and ethylene. The embodiments described below are discussed with reference to ethylene as the $\alpha$-olefin comonomer, but the embodiments are equally applicable to other copolymers with other $\alpha$-olefin comonomers. In this regard, the copolymers may simply be referred to as propylene-based polymers with reference to ethylene as the $\alpha$-olefin.

The PBE may include at least about 5 wt %, at least about 6 wt %, at least about 7 wt %, or at least about 8 wt %, or at least about 9 wt %, or at least about 10 wt %, or at least about 12 wt % ethylene-derived units, where the percentage by weight is based upon the total weight of the propylene-derived and ethylene-derived units. The PBE may include up to about 30 wt %, or up to about 25 wt %, or up to about 22 wt %, or up to about 20 wt %, or up to about 19 wt %, or up to about 18 wt %, or up to about 17 wt % ethylene-derived units, where the percentage by weight is based upon the total weight of the propylene-derived and ethylene-derived units. In some embodiments, the PBE may comprise from about 5 to about 25 wt % ethylene-derived units, or from about 7 wt % to about 20 wt % ethylene, or from about 9 to about 18 wt % ethylene-derived units, where the percentage by weight is based upon the total weight of the propylene-derived and ethylene-derived units.

The PBE may include at least about 70 wt %, or at least about 75 wt %, or at least about 80 wt %, or at least about 81 wt % propylene-derived units, or at least about 82 wt %, or at least about 83 wt % propylene-derived units, where the percentage by weight is based upon the total weight of the propylene-derived and α-olefin derived units. The PBE may include up to about 95 wt %, or up to about 94 wt %, or up to about 93 wt %, or up to about 92 wt %, or up to about 90 wt %, or up to about 88 wt % propylene-derived units, where the percentage by weight is based upon the total weight of the propylene-derived and α-olefin derived units.

The PBE can be characterized by a melting point (Tm), which can be determined by differential scanning calorimetry (DSC). Using the DSC test method described herein, the melting point is the temperature recorded corresponding to the greatest heat absorption within the range of melting temperature of the sample. When a single melting peak is observed, that peak is deemed to be the "melting point." When multiple peaks are observed (e.g., principal and secondary peaks), then the melting point is deemed to be the highest of those peaks. It is noted that at the low-crystallinity end at which elastomers are commonly found, the melting point peak may be at a low temperature and be relatively flat, making it difficult to determine the precise peak location. A "peak" in this context is thus defined as a change in the general slope of the DSC curve (heat flow versus temperature) from positive to negative, forming a maximum without a shift in the baseline where the DSC curve is plotted so that an endothermic reaction would be shown with a positive peak.

The Tm of the PBE (as determined by DSC) may be less than about 115° C., or less than about 110° C., or less than about 100° C., or less than about 95° C., or less than about 90° C. In some embodiments, the PBE may have two melting peaks as determined by DSC. In other embodiments, the PBE may have a single melting peak as determined by DSC.

The PBE may be characterized by its heat of fusion (Hf), as determined by DSC. The PBE may have an Hf that is at least about 0.5 J/g, or at least about 1.0 J/g, or at least about 1.5 J/g, or at least about 3.0 J/g, or at least about 4.0 J/g, or at least about 5.0 J/g, or at least about 6.0 J/g, or at least about 7.0 J/g. The PBE may be characterized by an Hf of less than about 75 J/g, or less than about 70 J/g, or less than about 60 J/g, or less than about 50 J/g, or less than about 45 J/g, or less than about 40 J/g, or less than about 35 J/g, or less than about 30 J/g, or less than 25 J/g.

The DSC procedures for determining Tm and Hf of the PBE include the following. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −30° C. to about −50° C. and held for 10 minutes at that temperature. The sample is heated at 10° C./min to attain a final temperature of about 200° C. The sample is kept at 200° C. for 5 minutes. Then a second cool-heat cycle is performed. Events from both cycles are recorded. The thermal output is recorded as the area under the melting peak of the sample, which typically occurs between about 0° C. and about 200° C. It is measured in Joules and is a measure of the Hf of the polymer.

Preferably, the PBE has crystalline regions interrupted by non-crystalline regions. The non-crystalline regions can result from regions of non-crystallizable propylene segments, the inclusion of comonomer units, or both. In one or more embodiments, the PBE has a propylene-derived crystallinity that is isotactic, syndiotactic, or a combination thereof. In a preferred embodiment, the PBE has isotactic sequences. The presence of isotactic sequences can be determined by NMR measurements showing two or more propylene derived units arranged isotactically. Such isotactic sequences can, in some cases be interrupted by propylene units that are not isotactically arranged or by other monomers that otherwise disturb the crystallinity derived from the isotactic sequences.

The PBE can have a triad tacticity of three propylene units (mmm tacticity), as measured by 13C NMR, of 75% or greater, 80% or greater, 85% or greater, 90% or greater, 92% or greater, 95% or greater, or 97% or greater. In one or more embodiments, the triad tacticity may range from about 75 to about 99%, or from about 80 to about 99%, or from about 85 to about 99%, or from about 90 to about 99%, or from about 90 to about 97%, or from about 80 to about 97%. Triad tacticity is determined by the methods described in U.S. Pat. No. 7,232,871.

The PBE may have a tacticity index m/r ranging from a lower limit of 4 or 6 to an upper limit of 8 or 10 or 12. The tacticity index, expressed herein as "m/r", is determined by $^{13}$C nuclear magnetic resonance ("NMR"). The tacticity index, m/r, may be calculated as defined by H. N. Cheng in Vol. 17, MACROMOLECULES, pp. 1950-1955 (1984), incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 describes an atactic material. An isotactic material theoretically may have a ratio approaching infinity, and many by-product atactic polymers have sufficient isotactic content to result in ratios of greater than 50.

The PBE may have a % crystallinity of from about 0.5% to about 40%, or from about 1% to about 30%, or from about 5% to about 25%, determined according to DSC procedures.

The comonomer content and sequence distribution of the polymers can be measured using $^{13}$C nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis. Reference is made to U.S. Pat. No. 6,525,157 which contains more details on GPC measurements, the determination of ethylene content by NMR and the DSC measurements.

The PBE may have a density of from about 0.85 g/cm³ to about 0.92 g/cm³, or from about 0.86 g/cm³ to about 0.90 g/cm³, or from about 0.86 g/cm³ to about 0.89 g/cm³ at room temperature, as measured per the ASTM D-792 test method.

The PBE can have a melt index (MI) (ASTM D-1238, 2.16 kg @ 190° C.), of less than or equal to about 100 g/10 min, or less than or equal to about 50 g/10 min, or less than or equal to about 25 g/10 min, or less than or equal to about 10 g/10 min, or less than or equal to about 9.0 g/10 min, or less than or equal to about 8.0 g/10 min, or less than or equal to about 7.0 g/10 min.

The PBE may have a melt flow rate (MFR), as measured according to ASTM D-1238 (2.16 kg weight @ 230° C.), greater than about 1 g/10 min, or greater than about 2 g/10 min, or greater than about 5 g/10 min, or greater than about 8 g/10 min, or greater than about 10 g/10 min. The PBE may have an MFR less than about 1,000 g/10 min, or less than about 750 g/10 min, or less than about 500 g/10 min, or less than about 400 g/10 min, or less than about 300 g/10 min, or less than about 200 g/10 min, or less than about 100 g/10 min, or less than about 75 g/10 min, or less than about 50 g/10 min. In some embodiments, the PBE may have an MFR from about 1 to about 100 g/10 min, or from about 2 to about 75 g/10 min, or from about 5 to about 50 g/10 min.

The PBE may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta b$ is the intrinsic viscosity of the polymer and $\eta l$ is the intrinsic viscosity of a linear polymer of the same viscosity-averaged molecular weight (Mv) as the polymer. $\eta l = KMv\alpha$, K and $\alpha$ are measured values for linear polymers and should be obtained on the same instrument as the one used for the g' index measurement.

The PBE may have a weight average molecular weight (Mw) of from about 100,000 to about 300,000 g/mol, or from about 150,000 to about 250,000 g/mol, or from about 150,000 to about 200,000 g/mol.

The PBE may have a number average molecular weight (Mn) of from about 2,500 to about 2,500,000 g/mol, or from about 5,000 to about 500,000 g/mol, or from about 10,000 to about 250,000 g/mol, or from about 25,000 to about 200,000 g/mol.

The PBE may have a Z-average molecular weight (Mz) of from about 10,000 to about 7,000,000 g/mol, or from about 50,000 to about 1,000,000 g/mol, or from about 80,000 to about 700,000 g/mol, or from about 100,000 to about 500,000 g/mol.

The molecular weight distribution (MWD, equal to Mw/Mn) of the PBE may be from about 1 to about 40, or from about 1 to about 15, or from about 1.8 to about 5, or from about 1.8 to about 3.

Optionally, the propylene-based polymer compositions may also include one or more dienes. In embodiments where the propylene-based polymer compositions comprises a diene, the diene may be present at from 0.05 wt % to about 6 wt % diene-derived units, or from about 0.1 wt % to about 5.0 wt % diene-derived units, or from about 0.25 wt % to about 3.0 wt % diene-derived units, or from about 0.5 wt % to about 1.5 wt % diene-derived units, where the percentage by weight is based upon the total weight of the propylene-derived, alpha-olefin derived, and diene-derived units.

In one or more embodiments, the PBE can optionally be grafted (i.e., "functionalized") using one or more grafting monomers. As used herein, the term "grafting" denotes covalent bonding of the grafting monomer to a polymer chain of the PBE. The grafting monomer can be or include at least one ethylenically unsaturated carboxylic acid or acid derivative, such as an acid anhydride, ester, salt, amide, imide, acrylates or the like. Illustrative monomers include but are not limited to acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxylethyl methacrylate and higher hydroxy-alkyl methacrylates and glycidyl methacrylate. Maleic anhydride is a preferred grafting monomer. In one or more embodiments, the grafted PBE comprises from about 0.5 to about 10 wt % ethylenically unsaturated carboxylic acid or acid derivative, more preferably from about 0.5 to about 6 wt %, more preferably from about 0.5 to about 3 wt %; in other embodiments from about 1 to about 6 wt %, more preferably from about 1 to about 3 wt %. In a preferred embodiment, wherein the graft monomer is maleic anhydride, the maleic anhydride concentration in the grafted polymer is preferably in the range of about 1 to about 6 wt %, preferably at least about 0.5 wt %, and highly preferably about 1.5 wt %.

In an embodiment, the PBE is a dual-reactor blend of a first polymer component and a second polymer component. In some embodiments, the comonomer content of the PBE can be adjusted by adjusting the comonomer content of the first polymer component, adjusting the comonomer content of second polymer component, and/or adjusting the ratio of the first polymer component to the second polymer component present in the propylene-based polymer composition. In such embodiments, the first polymer component may comprise propylene and ethylene and have an ethylene content of greater than 10 wt % ethylene, or greater than 12 wt % ethylene, or greater than 13 wt % ethylene, or greater than 14 wt % ethylene, or greater than 15 wt % ethylene, and an ethylene content that is less than 20 wt % ethylene, or less than 19 wt % ethylene, or less than 18 wt % ethylene, or less than 17 wt % ethylene, or less than 16 wt % ethylene, where the percentage by weight is based upon the total weight of the propylene-derived and ethylene derived units of the first polymer component. In such embodiments, the second polymer component may comprise propylene and ethylene and have an ethylene content of greater than 2 wt % ethylene, or greater than 3 wt % ethylene, or greater than 4 wt % ethylene, or greater than 5 wt % ethylene, or greater than 6 wt % ethylene, and an ethylene content that is less than 10 wt % ethylene, or less than 9.0 wt % ethylene, or less than 8 wt % ethylene, or less than 7 wt % ethylene, or less than 6 wt % ethylene, or less than 5 wt % ethylene, where the percentage by weight is based upon the total weight of the propylene-derived and ethylene derived units of the second polymer component. In such embodiments, the PBE may comprise from 3 to 25 wt % of the second polymer component, or from 5 to 20 wt % of the second polymer component, or from 7 to 18 wt % of the second polymer component, or from 10 to 15 wt % of the second polymer component, and from 75 to 97 wt % of the first polymer component, or from 80 to 95 wt % of the first polymer component, or from 82 to 93 wt % of the first polymer component, or from 85 to 90 wt % of the first polymer component, based on the weight of the PBE.

The PBE are preferably prepared using homogeneous conditions, such as a continuous solution polymerization process in parallel reactors. Exemplary methods for the preparation of propylene-based polymer may be found in U.S. Pat. Nos. 6,881,800; 7,803,876; 8,013,069; and 8,026,323 and PCT Publications WO 2011/087729; WO 2011/087730; and WO 2011/087731.

The catalyst systems used for producing the PBE may comprise a metallocene compound, such as the catalyst used to prepare a PBM described above.

A suitable PBE for use in the present invention includes some Vistamaxx™ grades available from ExxonMobil Chemical, including Vistamaxx™ 6000 series.

Other Components

The compositions used to prepare grip applications described herein may further comprise one or more propylene polymers and mineral powder.

Propylene Polymer

The Propylene Polymer ("PP") useful for making the grip application of the invention is a homopolymer of propylene or a copolymer of propylene and within the range from 0.05 or 0.1 or 0.5 wt % to 2.0 or 4.0 wt % ethylene or $C_4$ to $C_{10}$ α-olefin comonomer derived units. Preferably, the PP useful herein is a homopolymer of propylene. The PP is preferably a high crystallinity polypropylene, having a crystallinity of at least 40%, more preferably at least 70% or 80% or 90% as determined by DSC. Preferably, the polypropylene has a melting point temperature ("$T_m$", DSC) within the range of from 130° C. or 140° C. or 150° C. to 160° C. or 165° C. or 170° C. In an embodiment, the PP has a Melt Flow Rate ("MFR", 230° C./2.16 kg) within the range of from 100 or 500 or 1,000 g/10 min to 1,500 or 2,000 or 3,000 or 5,000 g/10 min. In an embodiment, the PP has a melt viscosity at 190° C. within the range of from about 5,000 or 7,000 or 10,000 to about 15,000 cP.

The PP can be produced with a catalyst system comprising one or more metallocenes. As used herein "metallocene" refers generally to compounds represented by the formula $Cp_mMR_nX_q$ wherein Cp is a cyclopentadienyl ring which may be substituted or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1-3, n=0-3, q=0-3, and the sum of m+n+q is equal to the oxidation state of the transition metal. Methods for preparing and using these types of metallocenes are well known. These metallocenes are discussed extensively in U.S. Pat. Nos. 4,769,510; 4,933,403; 5,120,867; and 5,314,973; each fully incorporated herein by reference.

Metallocenes are generally used in combination with some form of activator in order to create an active catalyst system. Ionizing activators may also be used with metallocenes. Ionizing activators may be neutral or ionic, or compounds such as tri(n-butyl)ammonium tetrakis(pentafluorophenyl)boron, which ionize the neutral metallocene compound. Such ionizing compounds may contain an active proton, or some other cation associated with but not coordinated or only loosely coordinated to the remaining ion of the ionizing compound. Combinations of activators may also be used; see for example, International Publication No. 94/07928.

The metallocene catalyst systems described above are preferably fixed on a support material. Preferably, the support material is a porous particulate material, such as talc, inorganic oxides, inorganic chlorides and resinous materials such as polyolefin or polymeric compounds.

The preferred support materials are porous inorganic oxide materials, which include those from the Periodic Table of Elements of Groups 2, 3, 4, 5, 13 or 14 metal oxides. Silica, alumina, silica-alumina, and mixtures thereof are most preferred. Other inorganic oxides that may be employed either alone or in combination with the silica, alumina or silica-alumina, are magnesia, titania, zirconia, and the like.

The catalyst systems may be used to polymerize propylene and optionally comonomers in any process including gas, slurry or solution phase or high pressure autoclave processes. Preferably, a gas or slurry phase process is used, most preferably a bulk liquid propylene polymerization process is used.

In an embodiment, the bulk liquid polymerization and copolymerization of propylene or ethylene, particularly propylene, in a slurry or gas phase polymerization process, particularly a slurry polymerization process. Another embodiment involves copolymerization reactions of propylene or ethylene, particularly propylene, with one or more of the alpha-olefin monomers having from 4 to 20 carbon atoms, preferably 4-12 carbon atoms, for example alpha-olefin comonomers of ethylene, butene-1, pentene-1, 4-methylpentene-1, hexene-1, octene-1, decene-1, and cyclic olefins such as styrene, cyclopentene or norbornene. Other suitable monomers include polar vinyl, diolefins such as dienes, for example, 1,3-butadiene, 1,4-hexadiene, norbornadiene or vinylnorbornene, acetylene and aldehyde monomers.

In another embodiment, propylene is polymerized with at least two different comonomers to form a terpolymer and the like, the preferred comonomers are a combination of alpha-olefin monomers having 3 to 10 carbon atoms, more preferably 3 to 8 carbon atoms, and/or dienes having 4 to 10 carbon atoms.

Typically, in a gas phase polymerization process, a continuous cycle is employed where in one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the cycle by a cooling system external to the reactor. The recycle stream is withdrawn from the fluidized bed and recycled back into the reactor. Simultaneously, polymer product is withdrawn from the reactor and new or fresh monomer is added to replace the polymerized monomer. (See for example U.S. Pat. Nos. 4,543,399; 4,588,790; 5,028,670;

5,352,749; 5,405,922; and 5,436,304 all of which are fully incorporated herein by reference.)

A slurry polymerization process generally uses pressures in the range of about 1 to about 500 atmospheres or even greater and temperatures in the range of −60° C. to about 280° C. In a slurry polymerization, a suspension of solid, particulate polymer is formed in a liquid polymerization medium to which ethylene and comonomers and often hydrogen along with catalyst are added. The liquid employed in the polymerization medium can be, for example, an alkane or a cycloalkane. The medium employed should be liquid under the conditions of polymerization and relatively inert. Non-limiting examples of liquid mediums include hexane and isobutane.

A suitable Propylene Polymer for use in the present invention includes PP3155E3, available from ExxonMobil Chemical.

Mineral Powder

The Mineral Powder suitable for making the grip application of the present invention includes but is not limited to calcium carbonate, titanium dioxide, and barium sulfate. A suitable calcium carbonate is commercially available from Omya. Other mineral compounds in powder form are also suitable for use in the present invention as a cost reducing measure of the resultant grip application.

Compositions used to Prepare Grips

Compositions according to the present invention comprise at least one PBM, at least one PBE, at least one PP, and mineral powder. The composition may comprise from about 5 to about 10 wt % of PBM based on the polymer blend. The composition may comprise from about 65 to about 75 wt % of PBE based on the polymer blend, preferably about 65 wt % to about 70 wt %. The composition may comprise from about 5 to about 10 wt % PP based on the polymer blend. The composition may comprise about 15 to about 30 wt % mineral powder based on the polymer blend, preferably about 15 to about 20 wt %. Preferably, the composition comprises about 7.5 wt % PBM, about 60 to about 70 wt % PBE, about 5 wt % PP, and about 20 wt % mineral powder. The compositions can be made by dry-blending the components or by metering the components directly into an extruder at the desired ratio.

The composition described herein can be used as molten feed material for injection molding apparatuses generally known in the art to construct a variety of grip applications. It should be appreciated that the formulations of the present disclosure, while being well suited to prepare grip applications, given the lower viscosity and hence improved processability at reduced manufacturing time, may also find utility in other applications as well. For example, in some embodiments, the compositions may have a viscosity at 170° C. and at 0.06 rad/s angular frequency of less than 1800 Pa-s, or less than 1700 Pa-s, or less than 1600 Pa-s, or less than 1500 Pa-s, or less than 1400 Pa-s. For example, in some embodiments, the compositions may have a viscosity at 170° C. and at 0.1 rad/s angular frequency of less than 1800 Pa-s, or less than 1700 Pa-s, or less than 1600 Pa-s, or less than 1500 Pa-s. For example, in some embodiments the compositions may have a viscosity at 170° C. and at 0.4 rad/s angular frequency of less than 1700 Pa-s, or less than 1600 Pa-s, or less than 1500 Pa-s. For example, in some embodiments, the compositions may have a viscosity at 170° C. and at 1 rad/s angular frequency of less than 1700 Pa-s, or less than 1600 Pa-s, or less than 1500 Pa-s, or less than 1400 Pa-s.

In some embodiments, the polymer blends are used to form a grip by an injection molding process that generally includes the steps of adjusting a grip mold, filling a mold with a the molten composition, and cooling the grip constructed therefrom. For example, the molten composition may be injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,380 kPa to 10,400 kPa. The grip mold is cooled, for example, between 10° C. and 70° C. The temperature will depend on the desired gloss and appearance desired for the grip. Typical cooling times are from 10 to 30 seconds, depending on the grip's thickness. Finally, the mold is opened and the grip is ejected.

The compositions useful for grips may further comprises one or more additive components in addition to the PBM, PBE, propylene polymer, and mineral powder components described above. Various additives may be present to enhance a specific property or may be present as a result of processing of the individual components. Additives which may be incorporated include, but are not limited to, fire retardants, antioxidants, plasticizers, pigments, vulcanizing or curative agents, vulcanizing or curative accelerators, cure retarders, processing aids, flame retardants, tackifying resins, flow improvers, and the like. Antiblocking agents, coloring agents, lubricants, mold release agents, nucleating agents, reinforcements, and fillers (including granular, fibrous, or powder-like) may also be employed. Nucleating agents and fillers may improve the rigidity of the grips.

EXAMPLES

Table 1 provides the Polymer Blend Modifiers (A and B), Propylene-Based Elastomer (C), and Propylene Polymer (D) used to prepare the compositions of the present invention. The PBMs and PBEs used in the examples were prepared using a solution polymerization process in parallel reactors having a metallocene-based catalyst. The PBM has a first and second propylene-based polymer component, where the first component is different from the second component. The PPs used in the examples were prepared using a polymerization process having a metallocene-based catalyst.

Figure 1:
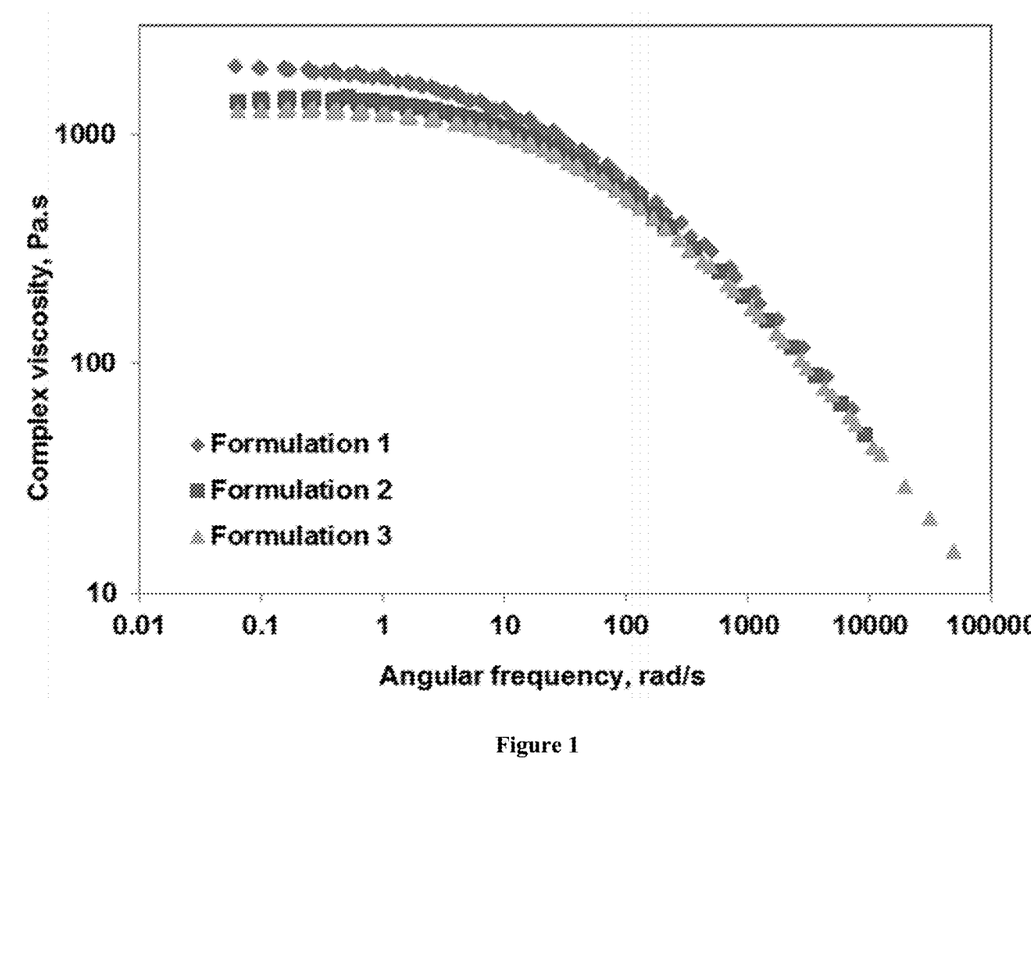
FIG. 1 shows flow parameters for a composition used to prepare grips.
Figure 2:
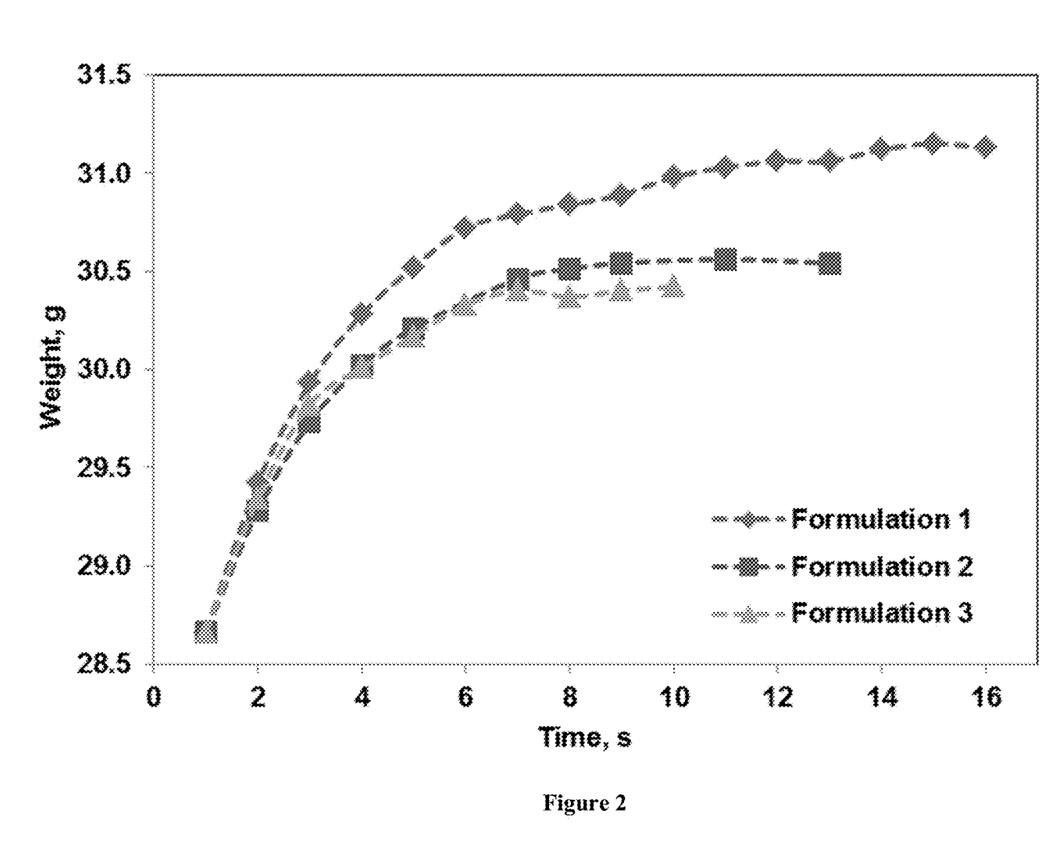
FIG. 2 shows cycle times for compositions used to prepare grips.

Table 2 provides the wt % of each component in the composition (i.e., by amount of Polymer Blend Modifier, Propylene-Based Elastomer, Propylene Polymer, and Mineral Powder (specifically, calcium carbonate commercially available from Omya). The Blends of Table 2 were prepared by mixing the respective amount of each component in a twin-screw compounding apparatus, such as a Brabender until homogeneity had been achieved. FIGS. 1 and 2 of the invention report the flow parameters and cycle time of the Polymer Blends of Table 2.

FIG. 1 shows flow parameters for compositions used to prepare grips. An ARES instrument was used to conduct dynamic frequency scans of the blends at 190° C., 170° C., 150° C., 130° C., 110° C., and 90° C. temperatures via the Small Amplitude Oscillatory Shear test method. Strain was kept at <10% to test the blends within the linear viscoelastic region. Frequency was varied between 100 rad/s and 0.1 rad/s with 5 data points measured per decade. The curve was shifted to reflect the reference temperature of 170° C. FIG. 1 shows that Formulations 2 and 3, having a Polymer Blend Modifier component, displayed reduced viscosities as measured at 170° C. Specifically, at 0.06 rad/s angular frequency, Formulation 1 having no Polymer Blend Modifier component had a viscosity of about 1970 Pa-s, in comparison to Formulation 2 having a viscosity of about 1380 Pa-s and Formulation 3 having a viscosity of about 1255 Pa-s. Likewise, at 0.1 rad/s angular frequency, Formulation 1 having no Polymer Blend Modifier component had a viscosity of about 1920 Pa-s, in comparison to Formulation 2 having a viscosity of about 1420 Pa-s and Formulation 3 having a viscosity of about 1275 Pa-s. Further, at 0.4 rad/s angular frequency, Formulation 1 having no Polymer Blend Modifier component had a viscosity of about 1830 Pa-s, in comparison to Formulation 2 having a viscosity of about 1410 Pa-s and Formulation 3 having a viscosity of about 1274 Pa-s. Similarly, at 1 rad/s angular frequency, Formulation 1 having no Polymer Blend Modifier component had a viscosity of about 1760 Pa-s, in comparison to Formulation 2 having a viscosity of about 1350 Pa-s and Formulation 3 having a viscosity of about 1220 Pa-s. Reducing the viscosity of the blend provides for improved flow during the injection molding process, thereby requiring reduced injection pressure to enable the polymer to fill the multi-cavity mold used to prepare grips. FIG. 1 shows insignificant differences in viscosities between Formulations 2 and 3, attributed to the small difference in molecular weights and hence viscosities of PBM A and B. It is generally expected that Formulation 2 having PBM A has a slightly lower viscosity than Formulation 3 having PBM B.

FIG. 2 shows Cycle Times for compositions used to prepare grips. Cycle Time was measured in relation to the crystallization rate of the compositions, using a gate seal time study. Formulations were molded on a 180-ton JSW injection molding apparatus using a standard ISO test plaque mold. The scientific molding method was used to determine the process at a melt temperature of 170° C. The gate seal time study was performed by starting with ¾ of transfer pressure for 1 second. The ISO plaque weight was noted after the gate was cut. One second of time was added to the holding time. Another plaque was molded and weighed. The process was repeated until a plateau was observed in the weight of the plaque. FIG. 2 shows that Formulations 2 and 3, having a Polymer Blend Modifier component, displayed reduced times to reach a plateau weight (signifying that the material had crystallized), hence a reduced Cycle Time. Specifically, Formulation 1 having no Polymer Blend Modifier took about 12 seconds to reach a plateau weight of about 31 g, Formulation 2 took about 9 seconds to reach a plateau weight of around 30.5 g, and Formulation 3 took about 8 seconds to reach a plateau weight of around 30.4 g. FIG. 2 shows that Formulations 2 and 3 would be expected to have similar manufacturing times as the plaque weight of each formulation stabilized around 7 seconds.

TABLE 1

| Composition Components | Estimated Melt Flow Rate, g/10 min | Ethylene Content, wt % | Mw, g/mol | Mw/Mn |
|---|---|---|---|---|
| Polymer Blend Modifier A | >1,000 | 4.01 | 27,600 | 2.36 |
| Polymer Blend Modifier B | >1,000 | 9.98 | 36,800 | 2.82 |
| Propylene-Based Elastomer C | 20 | 12.35 | 136,500 | 2.02 |
| Propylene Polymer D | 36 | 0 | 182,600 | 3.03 |

TABLE 2

| Formulation, wt % | Formulation 1 (COMPARATIVE) | Formulation 2 | Formulation 3 |
|---|---|---|---|
| Polymer Blend Modifier (A or B) | 0 | 7.5 (PBM A) | 7.5 (PBM B) |
| Propylene-Based Elastomer C | 75 | 67.5 | 67.5 |
| Propylene Polymer D | 5 | 5 | 5 |
| Mineral Powder | 20 | 20 | 20 |

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

We claim:
1. A composition comprising:
    i. from about 5 to about 10 wt % of a polymer blend modifier based on the weight of the composition, wherein the polymer blend modifier has a weight average molecular weight of about 10,000 to about 100,000 g/mole and comprises
        a first propylene-based polymer, wherein the first propylene-based polymer is a homopolymer of propylene or a copolymer of propylene and ethylene or a $C_4$ to $C_{10}$ alpha-olefin, and
        a second propylene-based polymer, wherein the second propylene-based polymer is a homopolymer of propylene or a copolymer of propylene and ethylene or a $C_4$ to $C_{10}$ alpha-olefin, and
        wherein the second propylene-based polymer is different than the first propylene-based polymer;
    ii. from about 65 to about 75 wt % of a propylene-based elastomer based on the weight of the composition, wherein the propylene-based elastomer has a weight average molecular weight of about 100,000 to about 300,000 g/mole;
    iii. from about 5 to about 10 wt % of a propylene polymer based on the weight of the composition, wherein the propylene polymer is a homopolymer of propylene or a copolymer of propylene units with from about 0.5 to about 4 wt % ethylene or $C_4$ to $C_{10}$ alpha-olefin comonomer derived units; and
    iv. a mineral powder.

2. The composition of claim 1, wherein the mineral powder is present in the amount of about 15 to about 30 wt % based on the weight of the composition, and wherein the mineral powder is selected from at least one of calcium carbonate, titanium dioxide, and barium sulfate.

3. The composition of claim 1, wherein the polymer blend modifier has a melt flow rate, as measured according to ASTM D-1238 (2.16 kg at 230° C.), of greater than about 1,000 g/10 min to less than about 10,000 g/10 min and wherein the propylene-based elastomer has a melt flow rate, as measured according to ASTM D-1238 (2.16 kg at 230° C.), of less than about 100 g/10 min.

4. The composition of claim 1, wherein the propylene-based elastomer comprises propylene and from about 5 to about 25 wt % units derived from one or more $C_2$ or $C_4$-$C_{12}$ alpha-olefins and has a triad tacticity greater than about 90% and a heat of fusion less than about 75 J/g.

5. The composition of claim 1, wherein the polymer blend modifier is a dual reactor blend.

6. The composition of claim 1, wherein the polymer blend modifier is a solution blend.

7. The composition of claim 1, wherein the first propylene-based polymer of the polymer blend modifier comprises a copolymer of propylene and ethylene, and the second propylene-based polymer of the polymer blend modifier comprises a copolymer of propylene and ethylene.

8. The composition of claim 1, wherein the first propylene-based polymer of the polymer blend modifier and the second propylene-based propylene polymer of the polymer blend modifier have a difference in heat of fusion of at least 10 J/g.

9. The composition of claim 1, wherein the propylene-based elastomer is a reactor blend of a first polymer component and a second polymer component.

10. The composition of claim 9, wherein the first polymer component comprises propylene and ethylene and has an ethylene content in the range of about 10 wt % to about 20 wt % based on the weight of the first polymer component.

11. The composition of claim 9, wherein the second polymer component comprises propylene and ethylene and has an ethylene content in the range of about 2 wt % to about 10 wt %, based on the weight of the second polymer component.

12. The composition of claim 9, wherein the propylene-based elastomer comprises from 3 to 25 wt % of the second polymer component, based on the weight of the propylene-based elastomer.

13. The composition of claim 1, wherein the polymer blend modifier has a polydispersity index of about 1.5 to about 6.

14. The composition of claim 1, wherein the propylene-based elastomer has a polydispersity index of about 1.8 to about 3.

15. A grip comprising the composition of claim 1.

16. A process comprising:
molding a composition comprising
(a) from about 5 to about 10 wt % of a polymer blend modifier based on the weight of the composition,
wherein the polymer blend modifier comprises
a first propylene-based polymer, wherein the first propylene-based polymer is a homopolymer of propylene or a copolymer of propylene and ethylene or a $C_4$ to $C_{10}$ alpha-olefin, and
a second propylene-based polymer, wherein the second propylene-based polymer is a homopolymer of propylene or a copolymer of propylene and ethylene or a $C_4$ to $C_{10}$ alpha-olefin,
wherein the second propylene-based polymer is different than the first propylene-based polymer;
wherein the polymer blend modifier has a weight average molecular weight of about 10,000 to about 100,000 g/mole;
(b) from about 65 to about 75 wt % of a propylene-based elastomer based on the weight of the composition, wherein the propylene-based elastomer has a weight average molecular weight of about 100,000 to about 300,000 g/mole; and
(c) from about 5 to about 10 wt % of a propylene polymer based on the weight of the composition;
wherein the propylene polymer is a homopolymer of propylene or a copolymer of propylene units with from about 0.5 to about 4 wt % ethylene or $C_4$ to $C_{10}$ alpha-olefin comonomer derived units, by the use of an injection molding machine.

17. The process of claim 16, wherein the polymer blend modifier, the propylene-based elastomer, and the propylene polymer are dry blended to form the composition.

18. The process of claim 16, wherein the composition has a viscosity at 170° C. and at 0.06 rad/s angular frequency of less than 1800 Pa-s.

19. The process of claim 16, wherein the composition has a viscosity at 170° C. and at 0.01 rad/s angular frequency of less than 1800 Pa-s.

20. The process of claim 16, further comprising holding the composition at a pressure from 1,380 kPa to 10,400 kPa for from 5 to 25 seconds.

* * * * *